United States Patent
Wong et al.

(10) Patent No.: US 6,708,723 B2
(45) Date of Patent: Mar. 23, 2004

(54) INWARDLY OPENING MECHANICAL VENT SYSTEM

(75) Inventors: Tak-Yiu Wong, Cerritos, CA (US); James Turvey, Costa Mesa, CA (US)

(73) Assignee: J. C. Carter Company, Inc., Cost Mesa, CA (US)

(*) Notice: Subject to any disclaimer, the term of this patent is extended or adjusted under 35 U.S.C. 154(b) by 270 days.

(21) Appl. No.: 09/845,536

(22) Filed: Apr. 30, 2001

(65) Prior Publication Data

US 2002/0157714 A1 Oct. 31, 2002

(51) Int. Cl.[7] .............................................. F16K 11/14
(52) U.S. Cl. .................... 137/587; 137/588; 137/347; 251/280; 251/144; 74/520
(58) Field of Search ................................ 251/280, 279, 251/144; 74/520, 521; 137/588, 589, 347, 587

(56) References Cited

U.S. PATENT DOCUMENTS

| | | | | |
|---|---|---|---|---|
| 497,871 A | | 5/1893 | Floyd | |
| 498,690 A | * | 5/1893 | Parish et al. | 251/280 |
| 727,503 A | * | 5/1903 | Walker, Jr. | 251/280 |
| 1,145,252 A | * | 7/1915 | Matthews | 137/587 |
| 2,042,906 A | * | 6/1936 | McElwaine | 251/280 |
| 2,539,076 A | | 1/1951 | Harris | |
| 3,149,642 A | | 9/1964 | Marx | |
| 3,420,495 A | * | 1/1969 | Muehl | 251/280 |
| 3,981,325 A | | 9/1976 | Robinson et al. | |
| 4,106,749 A | * | 8/1978 | Behle | 251/144 |
| 4,237,927 A | | 12/1980 | Stoller et al. | |
| 4,239,059 A | | 12/1980 | Stoller et al. | |
| 4,239,060 A | | 12/1980 | Stoller et al. | |
| 4,265,141 A | * | 5/1981 | Bowman | 74/516 |
| 5,511,575 A | | 4/1996 | Andenmatten et al. | |

* cited by examiner

*Primary Examiner*—A. Michael Chambers
(74) *Attorney, Agent, or Firm*—Kelly Brauersfeld Lowry & Kelley, LLP

(57) ABSTRACT

An inwardly opening mechanical vent system is provided for use in a fluid tank having a bottom loading valve and a vent formed in an upper tank surface. The vent system includes a spring interposed between a vent valve and a body extending downwardly into the tank to bias the vent valve upwardly into a closed position. A shaft extends downwardly from the vent valve and is connected to a lever mechanism. The lever mechanism includes a scissor-hinge assembly connected to a trunnion of the body. A linkage rod extends upwardly from the bottom loading valve and is capable of actuating the lever mechanism to lower the shaft and vent valve into the tank to open the vent when the bottom loading valve is opened.

23 Claims, 3 Drawing Sheets

INWARDLY OPENING MECHANICAL VENT SYSTEM

BACKGROUND OF THE INVENTION

The present invention relates generally to venting systems for storage tanks. More particularly, the present invention relates to an inwardly opening, mechanically operated vent system used for venting air from storage tanks when fluid is bottom loaded into the storage tank, or replacing air into the storage tank when fluid is unloaded.

Many storage tanks include bottom loading valves which allow the operator to operate the loading valve without going on top of the tank. This presents several advantages, including the gravity outflow of fluid during unloading. Also, the danger of the operator falling off the tank while operating the loading valve is eliminated. However, during loading and unloading a tank it is necessary to provide a vent to allow air to enter the tank during unloading, and allow air to leave the tank while the tank is being loaded.

In fluid bottom loading applications, mechanically operated vents are normally used in connection with the bottom loading valve. The bottom loading valve is installed in the bottom part of the storage tank, while the vent is installed at the top. These vents are commonly installed directly above the bottom loading valve, or in close vicinity thereto. A link, normally a pipe or a bar, is used to connect the bottom loading valve and the vent actuating mechanism so that the vent opens and closes automatically when the bottom operated loading valve is opened and closed. Thus, an equal volume of air will be displaced from or into the tank through the vent as fluid is being loaded or unloaded through the bottom loading valve. This prevents the tank from being burst by pressurization, or collapsed due to depressurization.

The bottom loading valve designs and vents of the prior art are normally closed using shut-off springs. The bottom loading valves are commonly pilot operated valves which are to be opened by the inlet fluid pressure as the pilots are actuated. As the bottom loading valve opens into the tank, the linkage simultaneously pushes the vent valve outward from the tank. In this mode of operation, the fluid pressure force must be sufficient to overcome both the spring forces in the vent and the bottom loading valve.

In the case of a storage tank being toppled or rolled over, the fluid stored in the tank will apply pressure on the vent. Since the previous art vents are outwardly opening, and held closed only by spring force, the pressure from generated by the depth of the fluid or the G-force created as the tank topples can overcome the vent spring force easily. Leakage or spillage may result from this design. This fluid-assisted opening of the vent causing spillage becomes particularly severe when the storage tank is mobile, such as a fluid transport vehicle, which might topple at high speeds and generate significant G-forces.

One solution to this problem is to put a very heavy spring in the vent to prevent it from opening under the fluid pressure as the tank rolls over. However, this necessitates an undesirably high inlet fluid pressure to overcome the combined spring forces to open the bottom loading valve and vent in normal fluid loading and unloading operations. Without adequate venting, the storage tank compartment can rupture or explode due to a significant increase or decrease in the tank internal pressure.

Accordingly, there is a need for a storage tank vent system that prevents fluid from inside the storage tank from spilling through the vent when the tank rolls over or is toppled. Such a vent system should only require a minimum force to allow the bottom loading valve to open at a much lower inlet pressure in normal fluid loading operations. What is also needed is a vent system that can be opened by external atmospheric pressure to compensate for the loss of internal pressure within the storage tank. The present invention fulfills these needs and provides other related advantages.

SUMMARY OF THE INVENTION

The present invention resides in an inwardly opening mechanical vent system for use in a fluid tank having a bottom loading valve and a vent formed in an upper tank surface. The vent system comprises a body extending downwardly into the tank from the upper tank surface. A vent valve is associated with the body and configured to seal the vent. Typically, a valve seat encircles the vent and is configured to engage the valve vent to cooperatively seal the vent. A spring is interposed between the vent valve and the body to bias the vent valve upwardly and into a closed position to seal the vent.

A shaft extends downwardly from the vent valve, and a lever mechanism is operably connected thereto. The body typically substantially surrounds the shaft, while permitting the shaft to reciprocally move through the body. The body includes apertures which allow fluid communication, of the air or vapor contents of the tank with the opened vent so that these can escape from the tank during loading.

The lever mechanism includes a scissor-hinge assembly connected to a trunnion of the body. The scissor-hinge assembly comprises a counter lever pivotally attached to the trunnion intermediate first and second ends thereof and an upper and lower hitch. The upper hitch is connected at one end to the shaft, and pivotally connected at the other end to the first end of the counter lever. The lower hitch is connected at one end to a slide associated with a guide extending from the body. The lower hitch is pivotally attached at the other end to a second end of the counter lever.

A linkage rod extends upwardly from the bottom loading valve, and is capable of actuating the lever mechanism to lower the shaft and vent valve into the tank to open the vent when the bottom loading valve is opened. More particularly, the guide is associated with the linkage rod in such a manner so as to permit the linkage to reciprocally move upwards into contact with the slide, and downwards away from the slide, while preventing substantial lateral movement of the linkage rod. Typically, the guide comprises a rod extending downwardly from the body, and the linkage rod includes a tubular portion that substantially surrounds the rod. Thus, as the bottom loading valve is opened, the linkage rod is moved upwardly into contact with the slide, causing the scissor-hinge assembly to collapse, and pull the vent valve and shaft downwardly to open the vent.

The inwardly opening mechanical vent system uses a shut-off spring with minimum force to allow the bottom loading valve to open at a much lower inlet pressure in normal fluid loading operations. When a vacuum is created in the storage tank, such as when unloading fluid from the bottom loading valve or leakage from the tank, atmospheric pressure can easily open the vent into the tank to compensate for the loss of internal pressure. Also, the invention prevents fluid from inside the storage tank from spilling through the vent when the tank rolls or topples over as the fluid pressure would cause the vent valve to move outward and further seal the vent.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
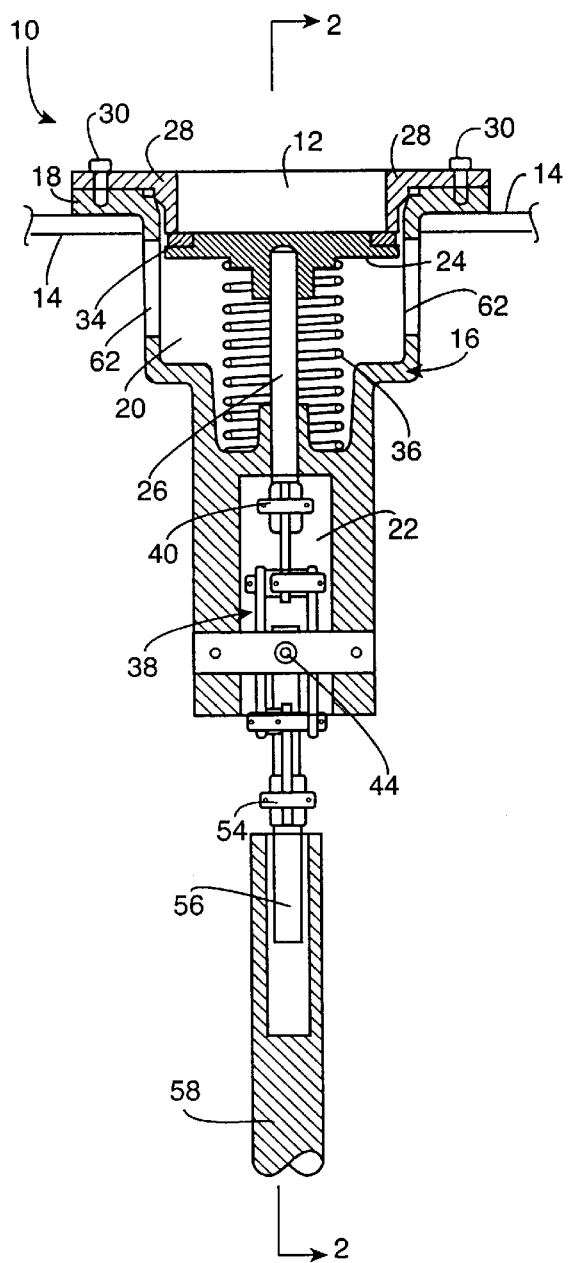
FIG. 1 is a cross-sectional view of an inwardly opening, mechanical vent system embodying the present invention.
Figure 2:
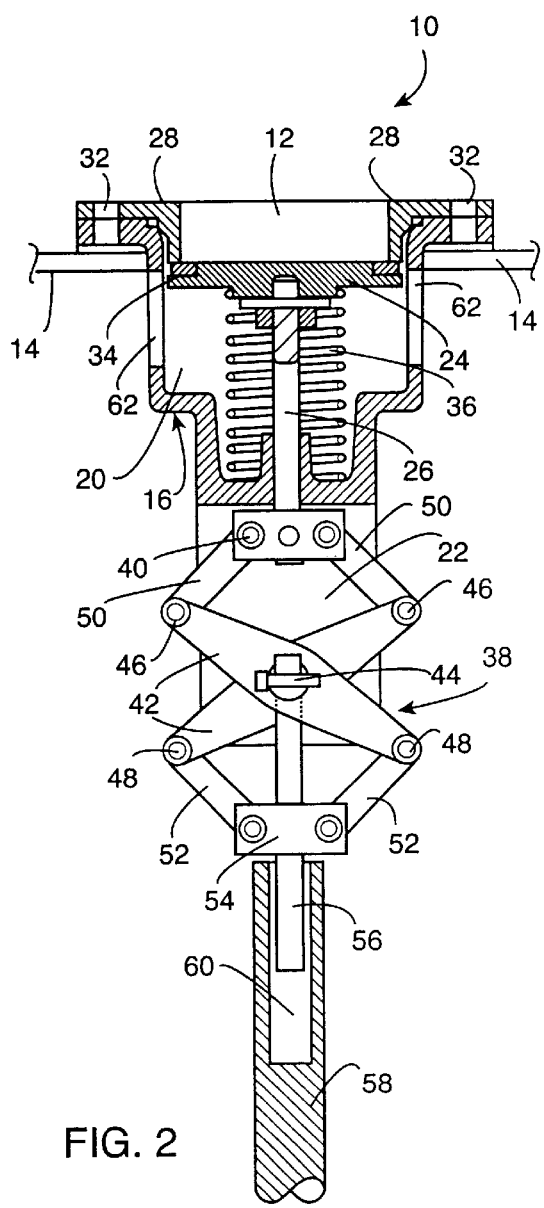
FIG. 2 is a cross-sectional view of the vent system of FIG. 1 taken generally along line 2—2, illustrating the vent system in a closed state.
Figure 3:
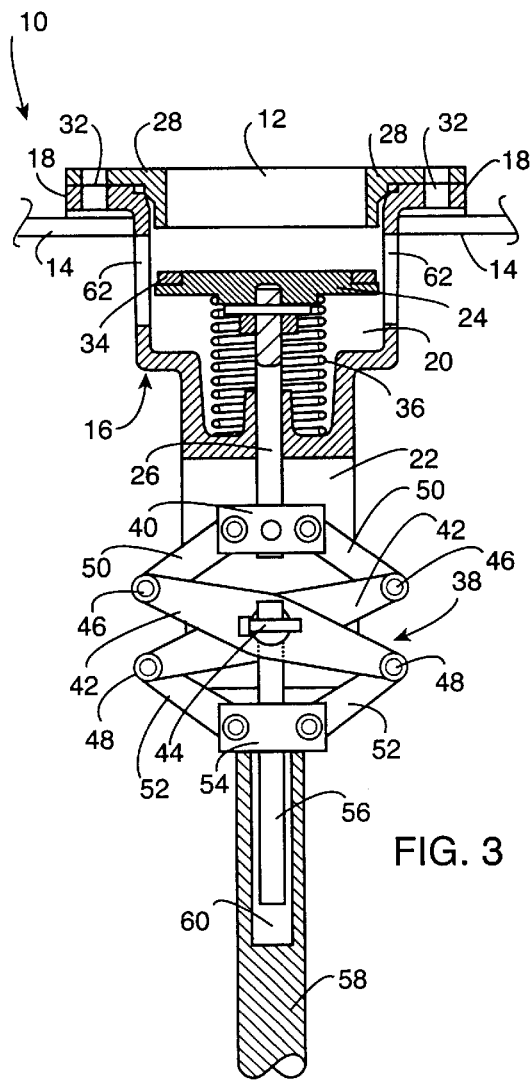
FIG. 3 is a cross-sectional view of the vent system of FIGS. 1 and 2, illustrating the vent system partially opened.
Figure 4:
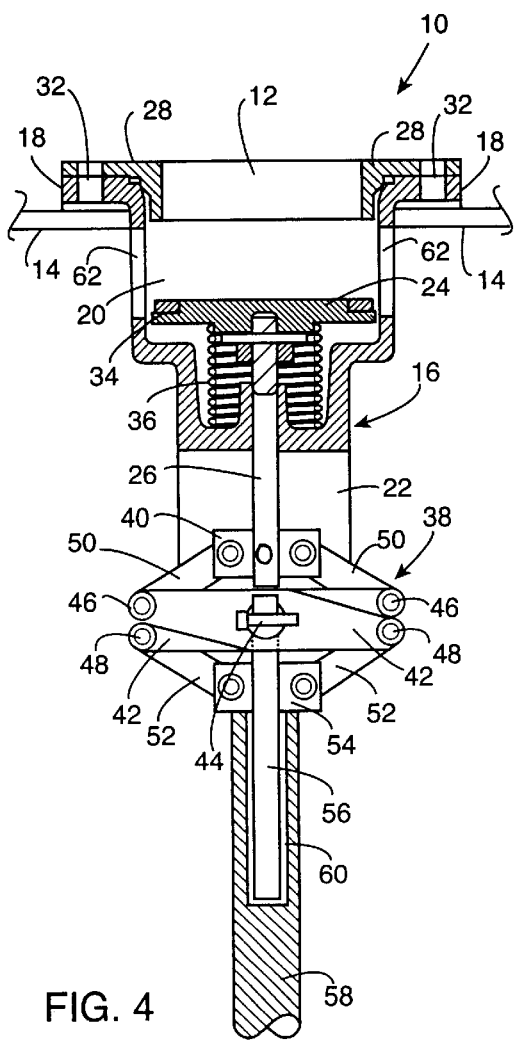
FIG. 4 is a cross-sectional view of the vent system of the present invention in a fully opened state.

As shown in the drawings for purposes of illustration, the present invention is concerned with an inwardly opening mechanical vent system, generally referred to by the reference number 10. With reference to FIGS. 1 and 2, a vent aperture 12 is formed in the storage tank wall 14, typically through a top surface of the storage tank generally opposite a bottom loading valve 64. A body 16 has an upper flange 18 which substantially encircles the vent aperture 12, and is configured to rest on the upper surface of the tank wall 14. The remainder of the body 16 extends through the vent aperture 12 and into the storage tank. The body 16 is configured to form two cavities 20 and 22. The body 16 may be comprised of several sections attached to one another, or a unitary structure as dictated by the design need.

A vent valve 24 and a shaft 26 extending downwardly from the vent valve 24 are positioned within the upper body cavity 20. The vent valve 24 is typically circular, and configured to seal the vent aperture 12. To aid in the complete sealing of the vent aperture 12, a valve seat.28 that encircles the vent aperture 12 and is configured to be placed onto the body's upper flange 18, and extend into the vent aperture 12. The valve seat 28 is secured to the body's upper flange 18 with bolts 30 extending through threaded apertures 32 to secure the valve seat 28 to the body 16. Appropriate adhesives, O-rings, or the like may also be used to create a fluid-tight seal between the body 60 and valve seat 28. The bolts 30 may extend into the tank wall 14, or the body 16 may be attached to the tank wall by other means, such as by adhesives or the like.

The vent valve 24 and lower portion of the valve seat 28 are configured to contact and cooperatively seal the vent aperture 12. The vent valve 24 may include a circumferential O-ring, or other resilient and sealable component, which contacts the lower end of the valve seat 28 to insure a fluid-tight seal between the valve seat 28 and vent valve 24, as well as to allow a degree of compression between the two.

A spring 36 is disposed within the body upper cavity 20 between the body 16 and the vent valve 24. Typically, the spring 36 is attached to the vent valve 24 and encircles the shaft 26. The spring 36 serves to bias the vent valve 24 in an upward position against the valve seat 28. As will be more fully described herein, this shut-off spring 36 need only have a minimum force due to the inward travel of the vent valve 24 during operation.

The shaft 26 extends through the body 16 and into the lower body cavity 22 where it is attached to a scissor-hinge assembly of a lever mechanism 38. The opening through the body 16 through which the shaft 26 passes actually serves as a vent valve guide to maintain the vent valve 24 in proper alignment with the valve seat 28. A shaft keeper 40 is typically attached to the end of the shaft 26 generally opposite the vent valve 24 and serves as a convenient connection point to the scissor-hinge assembly 38, as well as providing a stop to limit the upward movement of the shaft 26.

The lever mechanism 38 actually comprises a pair of scissor-hinge assemblies each having a counter lever 42 pivotally attached to a trunnion 44 attached to or extending from the body 16, intermediate the first and second ends 46 and 48 of the counter lever 42. An upper hitch 50 is connected at one end thereof to the shaft 26 or shaft keeper 40 and pivotally connected at the other end thereof to the first end of the counter lever 46. A lower hitch 52 is pivotally connected at one end thereof to the second end of the counter lever 48, and connected at the opposite end thereof to a slide 54.

The slide 54 is associated with a guide 56, typically in the form of a rod extending from the lower cavity 22 of the body 16. With such a configuration, the slide 54 encircles the, guide rod 56 and is freely movable along the length thereof.

A linkage rod 58 is operably connected to the bottom loading valve and extends upwardly to engage the slide 54. The linkage rod 58 preferably includes a tubular end forming an internal cavity 60 into which the guide rod 56 at least partially resides. This arrangement allows the linkage rod 58 to reciprocally move upwards into the contact with slide 54, and downwards away from the slide 54, while preventing substantial lateral movement of the linkage rod 58. Of course, other designs and configurations are possible which would serve to actuate the lever mechanism/scissor hinge assembly 38.

Figure 5:
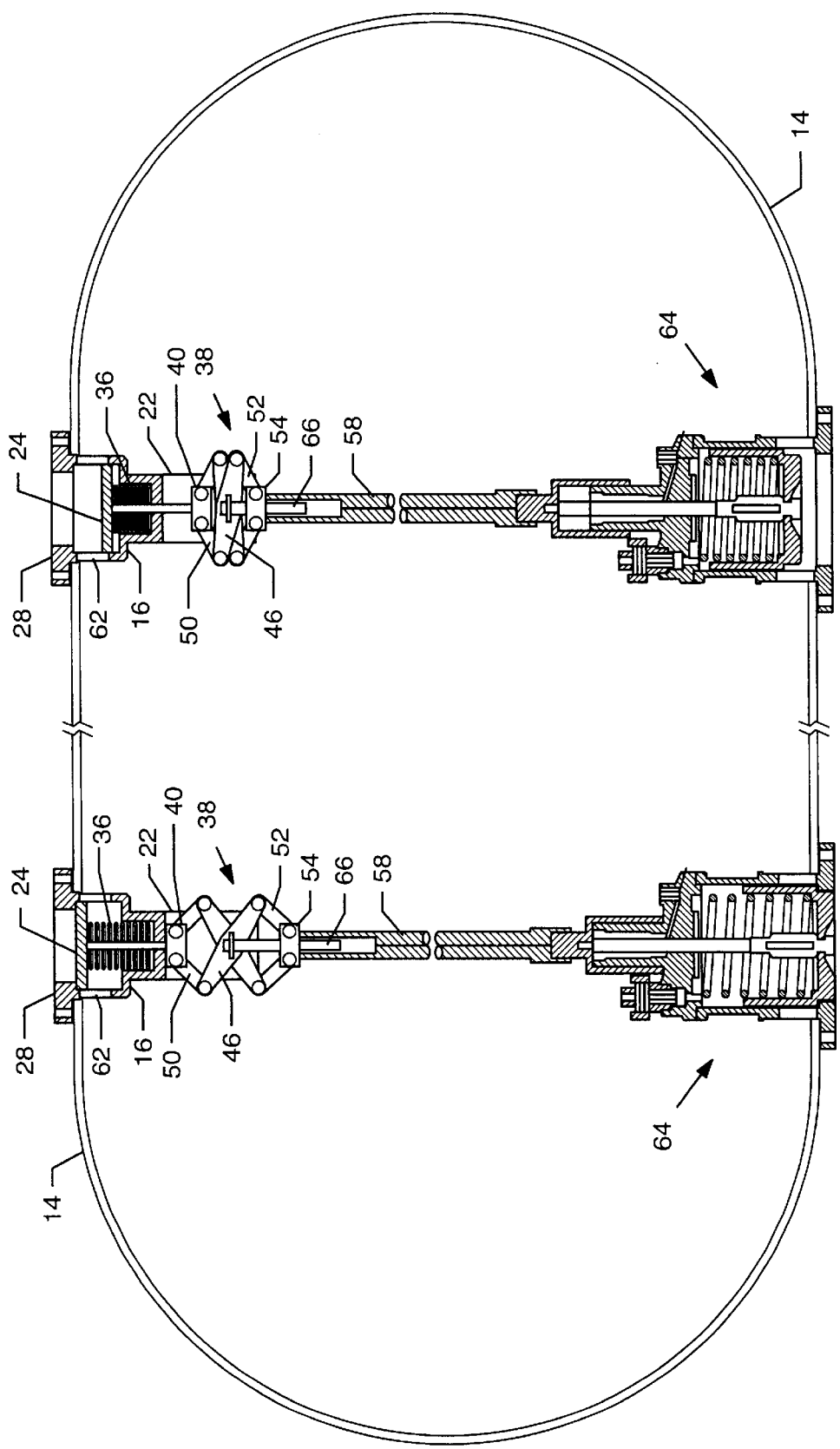
FIG. 5 is a cross-sectional view of a tank illustrating a vent valve being opened and closed in response to the opening and closing of a bottom loading valve of the tank.

Referring now to FIGS. 2–4 and 5, when the bottom loading valve 64 is opened, the linkage rod 58 is moved upwardly into the tank so as to contact the slide 54. As the linkage rod 58 and slide 54 move upward, the lever mechanism 38 is actuated and collapsed to pull the shaft 26 and vent valve 24 downward to open the vent aperture 12. More particularly, as the slide 54 is moved upwardly, lower hitches 52 push against the second ends of the counter levers 48, causing the counter levers 42 to pivot. Thus, as the second counter lever ends 48 are pushed upwardly, the first counter lever ends 46 are pivoted in the opposite direction and pull the upper hitches 50 downward. This results in the shaft 26 being pulled downward by the upper hitches 50 so as to compress the vent valve 24 against spring 36. If necessary, passages 62 are formed in the body 16 so that the compressed air and other gasses within the storage tank can exit through the now opened vent aperture 12. As the bottom loading valve 64 is completely opened, the linkage rod 58 is moved into its upmost position resulting in the vent valve 24 being pulled into the storage tank to allow the venting of air and gas without substantial obstruction as illustrated in FIG. 5.

As the bottom loading valve is closed, the linkage rod 58 is lowered. The shut-off spring 36 pushes upon the vent valve 24 to increasingly bias the vent valve 24 until it is in sealed contact with valve seat 28. The upward movement of the vent valve 24 causes the shaft 26 to be moved upwardly as well. The upward movement of the shaft 26 results in the upper hitches 50 pulling the first counter lever ends 46 upward, resulting in the second counter lever ends 48 to move downwardly and push the slide 54 downward along the guide rod 56 via the lower hitches 52.

Although the vent system 10 of the present invention uses a linkage with the bottom loading valve so that both the bottom loading valve and system can be opened simultaneously, the advantage of the invention is that when the storage tank is rolled over, the fluid within the storage tank pushes against the vent valve 24 in an outward direction so as to compress the vent valve 24 against the valve seat 28 and prevent the spill of fluid from the storage tank. This provides a solid closure of the fluid in the storage tank. In this configuration, only a light or relatively weak shut-off spring 36 is necessary to re-seat the vent valve 24 as the bottom loading valve is closed. A relatively insignificant addition of spring force from the vent valve 24 must be overcome when the bottom loading valve is opened. Thus, fluid loading pump pressure to open the bottom loading valve can be reduced and a higher flow rate into the storage tank can be achieved.

Most storage tanks are designed to withstand internal pressure rather than an internal vacuum. In the event that the link that connects the bottom loading valve and the vent system 10 fails in any manner, an internal vacuum can occur as fluid is displaced from the storage tank through the bottom loading valve. While potentially catastrophic, due to the potential for implosion of the storage tank in prior used systems, with the present invention, since the vent valve 24 opens inwardly into the storage tank and a very light spring is necessary to keep the vent aperture 12 closed, atmospheric pressure can actually push the vent valve 24 open to refurbish the displaced fluid volume with air during unloading even if the linkage fails. This prevents the storage tank from creating a vacuum inside and collapsing under atmospheric pressure.

Although an embodiment has been described in detail for purposes of illustration, various modifications may be made without departing from the scope and spirit of the invention. Accordingly, the invention is not to be limited, except as by the appended claims.

What is claimed is:

1. An inwardly opening mechanical vent system for use in a fluid tank, comprising:
    a bottom loading valve disposed in a lower portion of the tank;
    a linkage rod extending upwardly from the bottom loading valve and movable upwardly or downwardly as the bottom loadinq valve is opened or closed;
    a vent formed in an upper portion of the tank;
    a vent valve positioned within the tank and biased upwardly to seal the vent; and
    an opening mechanism operably connected to the vent valve and the linkage rod and adapted to move the vent valve in a direction opposite that of the movement of the linkage rod.

2. The system of claim 1, wherein the opening mechanism comprises a shaft extending downwardly from the vent valve and operably connected to a lever mechanism generally opposite the vent valve, and wherein the linkage rod actuates the lever mechanism to lower the shaft and vent valve into the tank and open the vent when the bottom loading valve is opened.

3. The system of claim 2, including a valve seat encircling the vent and configured to engage the valve vent to cooperatively seal the vent with the vent valve.

4. The system of claim 2, including a spring interposed between the vent valve and a body extending downwardly from the upper surface of the tank to bias the vent valve upwardly into a closed position.

5. The system of claim 2, wherein the lever mechanism includes a scissor-hinge assembly connected to a trunnion of a body extending downwardly from the upper tank surface.

6. The system of claim 5, wherein the scissor-hinge assembly includes a counter lever pivotally attached to the trunnion intermediate first and second ends thereof, an upper hitch connected at one end thereof to the shaft and pivotally connected at the other end thereof to the first end of the counter lever, and a lower hitch connected at one end thereof to a slide configured to engage the linkage rod and pivotally attached at the other end thereof to the second end of the counter lever.

7. The system of claim 6, wherein the slide is associated with a guide extending from the body.

8. The system of claim 7, wherein the guide is associated with the linkage rod in such a manner so as to permit the linkage rod to reciprocally move upwards into contact with the slide and downwards away from the slide, while preventing substantial lateral movement of the linkage rod.

9. The system of claim 7, wherein the guide comprises a rod extending downwardly from the body and the linkage rod includes a tubular portion that substantially surrounds the rod.

10. The system of claim 5, wherein the body substantially surrounds the shaft while permitting the shaft to reciprocally move therethrough, and includes apertures which allow fluid communication of contents of the tank with the opened vent.

11. An inwardly opening mechanical vent system for use in a fluid tank having a bottom loading valve and a vent formed in an upper tank surface, the vent system comprising:
    a vent valve positioned within the tank and biased upwardly to seal the vent;
    a shaft extending downwardly from the vent valve;
    a lever mechanism operably connected to the shaft generally opposite the vent valve; and
    a linkage rod extending upwardly from the bottom loading valve and capable of actuating the lever mechanism to lower the shaft and vent valve into the tank to open the vent when the bottom loading valve is opened;
    wherein the lever mechanism includes a scissor-hinge assembly connected to a trunnion of a body extending downwardly from the upper tank surface; and
    wherein the scissor-hinge assembly includes a counter lever pivotally attached to the trunnion intermediate first and second ends thereof, an upper hitch connected at one end thereof to the shaft and pivotally connected at the other end thereof to the first end of the counter lever, and a lower hitch connected at one end thereof to a slide configured to engage the linkage rod and pivotally attached at the other end thereof to the second end of the counter lever.

12. An inwardly opening mechanical vent system for use in a fluid tank having a bottom loading valve and a vent formed in an upper tank surface, the vent system comprising:
    a body extending downwardly into the tank from the upper tank surface;
    a vent valve associated with the body and configured to seal the vent;
    a spring interposed between the vent valve and the body to bias the vent valve upwardly into a closed position;
    a shaft extending downwardly from the vent valve;

a lever mechanism including a scissor-hinge assembly operably connected to the shaft generally opposite the vent valve and a trunnion of the body; and a linkage rod extending upwardly from the bottom loading valve and capable of actuating the lever mechanism to lower the shaft and vent valve into the tank to open the vent when the bottom loading valve is opened.

13. The system of claim 12, wherein the scissor-hinge assembly includes a counter lever pivotally attached to the trunnion intermediate first and second ends thereof, an upper hitch connected at one end thereof to the shaft and pivotally connected at the other end thereof to the first end of the counter lever, and a lower hitch connected at one end thereof to a slide configured to engage the linkage rod and pivotally attached at the other end thereof to the second end of the counter lever.

14. The system of claim 13, wherein the slide is associated with a guide extending from the body.

15. The system of claim 14, wherein the guide is associated with the linkage rod in such a manner so as to permit the linkage rod to reciprocally move upwards into contact with the slide and downwards away from the slide, while preventing substantial lateral movement of the linkage rod.

16. The system of claim 15, wherein the guide comprises a rod extending downwardly from the body and the linkage rod includes a tubular portion that substantially surrounds the rod.

17. The system of claim 13, wherein the body substantially surrounds the shaft while permitting the shaft to reciprocally move therethrough, and includes apertures which allow fluid communication of contents of the tank with the opened vent.

18. The system of claim 13, including a valve seat encircling the vent and configured to engage the valve vent to cooperatively seal the vent with the vent valve.

19. An inwardly opening mechanical vent system for use in a fluid tank having a bottom loading valve and a vent formed in an upper tank surface, the vent system comprising:

a body extending downwardly into the tank from the upper tank surface;

a vent valve associated with the body and configured to seal the vent;

a spring interposed between the vent valve and the body to bias the vent valve upwardly into a closed position;

a shaft extending downwardly from the vent valve;

a lever mechanism operably connected to the shaft generally opposite the vent valve and the body, the lever mechanism comprising a scissor-hinge assembly including a counter lever pivotally attached to the body intermediate first and second ends thereof, an upper hitch connected at one end thereof to the shaft and pivotally connected at the other end thereof to the first end of the counter lever, and a lower hitch connected at one end thereof to a slide associated with a guide extending from the body, the lower hitch being pivotally attached at the other end thereof to the second end of the counter lever; and a linkage rod extending upwardly from the bottom loading valve and capable of actuating the lever mechanism by engaging the slide to lower the shaft and vent valve into the tank to open the vent when the bottom loading valve is opened.

20. The system of claim 19, wherein the guide is associated with the linkage rod in such a manner so as to permit the linkage rod to reciprocally move upwards into contact with the slide and downwards away from the slide, while preventing substantial lateral movement of the linkage rod.

21. The system of claim 20, wherein the guide comprises a rod extending downwardly from the body and the linkage rod includes a tubular portion that substantially surrounds the rod.

22. The system of claim 19, wherein the body substantially surrounds the shaft while permitting the shaft to reciprocally move therethrough, and includes apertures which allow fluid communication of contents of the tank with the opened vent.

23. The system of claim 19, including a valve seat encircling the vent and configured to engage the valve vent to cooperatively seal the vent with the vent valve.

* * * * *

UNITED STATES PATENT AND TRADEMARK OFFICE
CERTIFICATE OF CORRECTION

PATENT NO. : 6,708,723 B2
DATED : March 23, 2004
INVENTOR(S) : Tak-Yiu Wong et al.

It is certified that error appears in the above-identified patent and that said Letters Patent is hereby corrected as shown below:

<u>Column 5,</u>
Line 31, delete the word "upwardly".
Line 42, Claim 1 should read:
1. An inwardly opening mechanical vent system for use in a fluid tank, comprising:
    a bottom loading valve disposed in a lower portion of the tank;
    a linkage rod extending upwardly from the bottom loading valve and movable upwardly or downwardly as the bottom loading valve is opened or closed;
    a vent formed in an upper portion of the tank;
    a vent valve positioned within the tank and biased to seal the vent; and
    an opening mechanism operably connected to the vent valve and the linkage rod and adapted to move the vent in a direction opposite that of the movement of the linkage rod.

Signed and Sealed this

Third Day of August, 2004

JON W. DUDAS
*Acting Director of the United States Patent and Trademark Office*